INVENTOR.
WILLIAM H. TYGART
BY
Agent

Aug. 31, 1965 W. H. TYGART 3,204,153

RELAXATION DIVIDER

Filed May 15, 1962 2 Sheets-Sheet 2

INVENTOR.
WILLIAM H. TYGART
BY
George C. Sullivan
Agent 3,204,153

RELAXATION DIVIDER

William H. Tygart, Marietta, Ga., assignor to Lockheed Aircraft Corporation, Burbank, Calif.

Filed May 15, 1962, Ser. No. 194,807
11 Claims. (Cl. 317—148.5)

This invention relates to an improved relaxation divider, and more particularly to a transistorized relaxation divider circuit in which the ratio of the input pulses to the circuit may be varied with respect to the output pulses from the circuit.

Prior art relaxation dividers, wherein a storage capacitor is charged by a plurality of input pulses until the capacitor is charged to a level sufficient to discharge a transistor or gaseous tube, have heretofore been limited to applications wherein the input pulse rate to the capacitor was relatively high so that the capacitor would not "leak off" the applied voltage prior to discharging the transistor. Such prior art relaxation dividers have had the further disadvantage of providing output pulses of such short duration that the output pulses of the divider were not of sufficient duration to perform a proper switching function. In view of these limitations of such prior art devices, elaborate circuitry has been resorted to; and in most cases, heavy, bulky vacuum tube counting circuits have resulted. Such limitations and deficiencies of prior art relaxation dividers are eliminated in accordance with this invention.

The relaxation divider of this invention permits the use of ordinary transistors; provides output pulses of long duration; permits the use of a transistor with very slow input pulse rates without excessive storage capacitor leakage, thus providing a means for slow counting; is lightweight; and is relatively temperature insensitive.

It will be seen, therefore, that it is an object of this invention to provide a lightweight and compact relaxation divider.

Another object of this invention is to provide a relaxation divider utilizing transistor means with a very slow input pulse rate by substantially eliminating capacitor leakage.

It is a further object of this invention to provide a relaxation divider wherein the output pulses are of long duration.

A further object of this invention is to provide a relaxation divider having a high division ratio.

Still a further object of this invention is to provide a relaxation divider which is not adversely affected by transient temperature variations.

Figure 1:
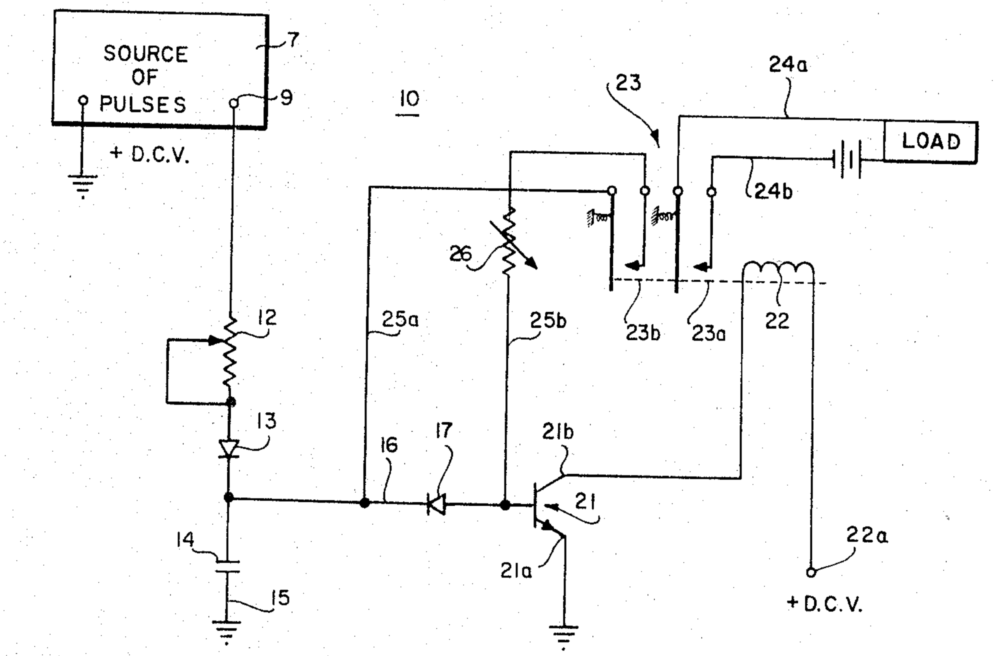
Figure 2:
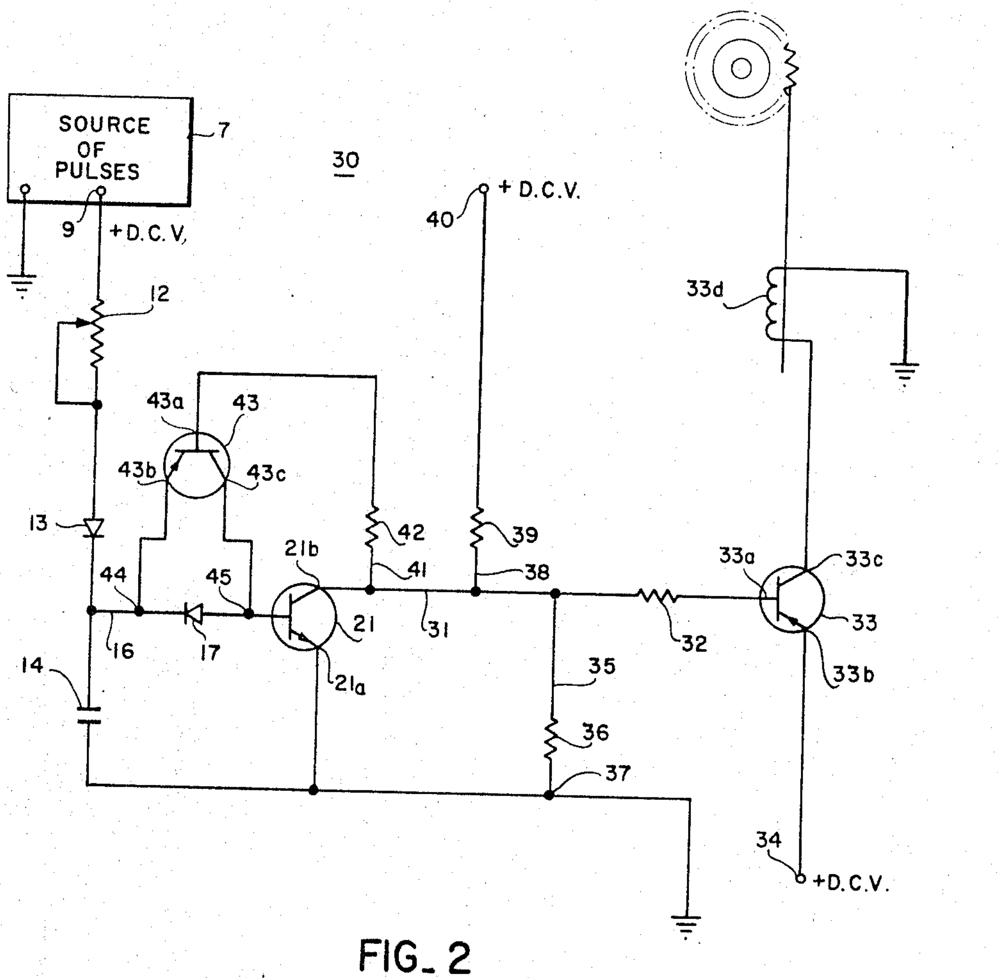

Other objects and advantages will become apparent from the following description taken in connection with the accompanying drawing in which:

FIGURE 1 is a schematic diagram of a preferred relaxation divider embodying the principles of this invention; and FIGURE 2 is a schematic diagram of an alternate embodiment of the relaxation divider of this invention.

Generally stated, a preferred embodiment of the invention comprises a relaxation divider circuit including means applying a train of pulses to the circuit; a storage capacitor receiving and storing the input pulses, and thereafter supplying the input pulses to a switching device; a unidirectional device which breaks down in the reverse direction upon the application of a voltage of predetermined magnitude disposed between the storage capacitor and the switching device; and means for shunting the storage capacitor output around the unidirectional device during its discharge cycle.

More specifically, there is shown in FIGURE 1 a relaxation divider 10, which includes a source of pulses 7 which may be one of many types. For example, the pulses may be provided by a rotating contact cyclically connecting a source of D.C. voltage to relaxation divider input point 9 or the source of pulses may be a chain of positive pulses which are supplied to the input point 9 of the relaxation divider 10 by an electronic pulse generator.

Relaxation divider 10 comprises the input terminal 9, a selectively variably adjustable resistor 12, a unidirectional device or diode 13, and a storage capacitor 14. The storage capacitor 14 is connected to ground at 15 and by lead 16 to a unidirectional current flow device 17 which breaks down in the reverse direction upon receiving a signal of predetermined magnitude. Device 17 is preferably a Zener diode which may be designed to have an inverse breakdown voltage of any desired magnitude. Device 17 is connected to the base of switching transistor 21, the emitter **21*a* of which is connected to ground, and the collector 21*b* of which is connected to a coil 22. The coil 22 is connected to a source of D.C. voltage at 22*a*. The coil 22 is disposed in operative actuating relation relative to a switch 23 having one pair of normally open contacts 23*a* connecting leads 24*a* and 24*b* to output, and another set of normally open contacts 23*b* connecting leads 25*a* and 25*b* in shunt circuit around device 17. Also, an adjustable resistor 26 for changing the length of time transistor 21 is turned on is connected in lead 25*b*. The coil 22 may be said to form a part of the switch 23. The portion of the relaxation divider circuit comprising resistor 12, diode 13 and capacitor 14 is the controlling portion of the divider; transistor 21, coil 22 and switch 23 comprise a switching portion of the divider; the Zener diode 17 is a voltage reference device which isolates the controlling portion of the circuit from the switching portion of the circuit prior to switching; and leads 24*a* and 24*b*** comprise an output circuit including a source of power and a load.

In operation, when no voltage is supplied to the circuit from source 7, the contacts of switch 23 are open as shown in FIGURE 1 and the transistor 21 is not conducting. Upon the application of input voltage to point 9, voltage is stored in capacitor 14 by consecutive input pulses until the capacitor is charged to a level slightly greater than the rated inverse breakdown voltage level of the Zener diode 17. The number of input voltage pulses required to charge the capacitor 14 to this level is determined by the magnitude of the input pulses, the setting of variable resistor 12, and the size of capacitor 14. When this condition is reached, the Zener diode 17 breaks down in the reverse direction permitting the capacitor 14 to discharge through the Zener diode and the base-emitter junction of transistor 21 to ground to turn on the transistor. The turning on of transistor 21 provides a current path from ground through the emitter-collector junction of the transistor, through coil 22 to a source of D.C. voltage to energize the coil 22 which in turn closes the switch contacts **23*a* and 23*b* of switch 23. Current is therefore permitted to flow in the circuit comprising leads 24*a* and 24*b* which may be any suitable type of controlled circuit which is connected to a source of power; and, additionally, leads 25*a* and 25*b* are connected together in shunt circuit around Zener diode 17**.

The Zener diode 17 in the discharge circuit of the storage capacitor 14 performs the important function of isolating the control portion of the divider from the switching portion of the divider while the capacitor is charging to prevent the capacitor from prematurely discharging and to prevent the capacitor from leaking off while charging even when the time interval between input pulses is quite long and the division ratio is quite high. If only a Zener diode were provided between the control and switching portions of the circuit, the capacitor 14 would pulse the transistor at short time intervals for short periods of time as the level of the voltage stored on the capacitor would fluctuate just above and just below the rated inverse breakdown voltage of the Zener diode, resulting in a low division ratio and a lack of assurance that contacts **23*a* would close for a sufficiently long period of time to produce an output signal in each cycle of operation. For these reasons leads 25*a* and 25*b* are connected in shunt circuit around Zener diode 17 and are controlled by the activation of coil 22 so that the storage capacitor will discharge after its voltage level has diminished far beneath the breakdown voltage of the Zener diode to maintain the transistor 21 in a conducting state until the charge on capacitor 14 is approximately zero. At the time transistor 21 turns off, the coil 22 is de-energized opening switch contacts 23*a* and 23*b*** to reset the relaxation divider for the next cycle of operation.

It will be appreciated from the foregoing that the preferred relaxation divider 10 of this invention may be used in applications where the input voltage pulse rate is very slow and that the division ratio thereof may be selected to be very high by selectively adjusting variable resistor 12, thus providing means for extremely slow counting. Also, the switch contacts **23*a* are maintained closed for a sufficient length of time to produce an output signal of long duration in the output circuit comprising leads 24*a* and 24*b* during each cycle of operation. Additionally, the relaxation divider is inherently temperature insensitive because the Zener diode 17 being a low leakage device and the switch contacts 23*b*** being open during the charging of the capacitor isolate the controlling portion of the circuit from the switching portion of the circuit prior to switching. Thus, the controlling circuit portion and the switching circuit portion are connected only during determinable periods of time and therefore there is no current path, the resistance of which would decrease with an increase in temperature, through which the charge being stored on the storage capacitor could leak off during the charging of the capacitor which might result in inaccurate counting by the relaxation divider.

Referring now to FIGURE 2 therein shown is an alternate embodiment of the relaxation divider of this invention wherein the components identical to those in the preferred embodiment will be given like reference numerals. In the relaxation divider 30 of FIGURE 2 the control portion of the circuit is identical to that in the preferred embodiment of the relaxation divider. The difference resides in providing a fully transistorized switching circuit portion as will more clearly appear. More specifically, the collector **21*b* of transistor 21 is connected by a lead 31 having resistor 32 therein to the base 33*a* of transistor 33. Transistor 33 further includes an emitter 33*b* connected at 34 to a source of positive D.C. voltage and a collector 33*c* connected to a circuit to be controlled, which may include the coil 33*d* of any appropriate stepping device of a register, counter or switching device, for example. Lead 31 is connected by lead 35 having resistor 36 therein to ground at 37 and by lead 38 having resistor 39 therein to a source of positive D.C. voltage at 40. Also, lead 31 is connected by lead 41 having resistor 42 therein to the base 43*a* of transistor 43. The emitter 43*b* of the transistor 43 is connected to the control circuit portion of lead 16 at 44, and the collector 43*c* thereof is connected to the switching circuit portion of lead 16 at 45 to provide a shunt circuit around Zener diode 17**.

In operation, when no voltage is supplied to the circuit from source 7, transistors 21, 33 and 43 are not conducting. Upon the application of successive input voltage pulses to the input point 9 of the circuit, storage capacitor 14 is charged by incremental amounts to the rated inverse breakdown voltage level of Zener diode 17. During the capacitor charging cycle, the transistor 43 is maintained off by the presence of the high positive potential on its base. At the time capacitor 14 is charged to the rated inverse breakdown voltage level of Zener diode 17, the Zener diode breaks down discharging capacitor 14. A positive voltage is therefore applied to the base of transistor 21 turning it "on" and providing a current path through the emitter-collector junction of the transistor. The voltage in lead 31 therefore becomes less positive and the voltages being applied to the bases of transistors 43 and 33, accordingly, become less positive and after an incremental length of time become more negative than the positive voltages being applied to their emitters. Transistor 43 therefore turns on to provide a shunt circuit through its emitter-collector junction around the Zener diode 17 to continue the discharge of capacitor 14 after its voltage level has diminished below the breakdown voltage of the Zener diode 17 to maintain the transistor 21 conducting until the charge on the capacitor 14 is approximately zero. Also, transistor 33 turns on to provide an output voltage signal during the time transistor 21 is conducting to provide an output pulse of long duration in the output circuit which will assure the proper activation of the coil **33*d* during each cycle of operation. At the time transistor 21 turns off, the voltages being applied to the bases of transistors 43 and 33** become more positive than the voltages being applied to their emitters; and the transistors therefore turn off resetting the relaxation divider for the next cycle of operation.

It will be seen from the foregoing that the relaxation divider 30 performs substantially the same precision counting function as the preferred embodiment in that it includes circuitry for isolating the control portion of the divider from the switching portion of the divider while the capacitor is charging to prevent the capacitor from leaking off voltage during the charging thereof, and additionally includes circuitry for producing an output signal of long duration. The relaxation divider 30 has the advantage of being more compact than the preferred embodiment and being less subject to vibrations. However, it has the disadvantage of being temperature sensitive in that isolation of the circuit portions during the charging of capacitor 14 must depend upon the quality of transistor 43. More specifically, the transistor 43 must be selected to be of a type having a low leakage through its emitter-collector junction so that leakage current will not have a tendency to leak off the current stored on capacitor 14 during the charging thereof, thus varying the counting accuracy of the relaxation divider.

While particular embodiments of the invention have been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. A relaxation divider comprising: a controlling circuit portion including a storage capacitor for storing input voltage pulses; a voltage reference device breaking down in the reverse direction upon receipt of a voltage of predetermined magnitude connected at one side to the discharge circuit of said capacitor for preventing premature discharge thereof; a switching circuit portion connected to the other side of said voltage reference device including means producing an output voltage pulse during the time said switching circuit portion receives a pulse from said controlling circuit portion; and means connecting a circuit in shunt around said voltage reference device during the time said switching circuit portion receives a pulse from said controlling circuit portion.

2. The relaxation divider of claim 1 wherein said voltage reference device is a Zener diode.

3. The relaxation divider of claim 1 wherein said means connecting a circuit in shunt about said voltage reference device includes a coil operated set of contacts.

4. The relaxation divider of claim 1 wherein said means connecting a circuit in shunt about said voltage reference device is a transistor.

5. The relaxation divider of claim 1 wherein said means producing an output voltage pulse includes a coil operated set of contacts.

6. The relaxation divider of claim 1 wherein said means producing an output voltage pulse includes a transistor.

7. In combination: a source of input pulses; a storage capacitor having a first side connected to ground and a second side connected to said source of pulses; a unidirectional device which breaks down in the reverse direction upon the application of a voltage of predetermined magnitude conected to said second side of said capacitor; said device operatively connected to a switching transistor; and a switch having first and second normally open sets of switch contacts operatively connected to said switching transistor, said first set of switch contacts operative when closed to activate a shunt circuit around said unidirectional device, and said second set of switch contacts operative when closed to activate an output circuit.

8. A relaxation divider comprising: a storage capacitor connected at one side to ground; a Zener diode having one of its sides connected to the other side of said capacitor; a switching transistor connected to the other side of said Zener diode; a coil connected to said switching transistor and to a source of power; a switch including at least two switch contact means operatively disposed relative to said coil; normally open circuit means in shunt about said Zener diode; normally open output circuit means; and means for incrementally charging said capacitor, said capacitor upon being charged to a voltage equal to the rated inverse breakdown voltage of said Zener diode discharging through said Zener diode and said switching transistor to turn on said transistor thereby energizing said coil which in turn operates said switch contact means, one of said switch contact means being operative to close said shunt circuit means during the discharge cycle of said capacitor, and the other of said switch contact means being operative to close said output circuit during the discharge cycle of said capacitor.

9. A relaxation divider comprising: a selectively variable resistor; a storage capacitor connected at one side to said resistor; a Zener diode having one of its sides connected to the other side of said capacitor; a switching transistor connected to the other side of said Zener diode; a coil connected to said transistor and to a source of power energizing the coil when said transistor is turned on; at least two switch contact means operatively disposed relative to said coil to be operated thereby; normally open shunt circuit means around said Zener diode; and normally open relaxation divider output circuit means, said capacitor upon being charged to a voltage equal to the rated inverse breakdown voltage of said Zener diode discharging through said Zener diode and said switching transistor to turn on said switching transistor thereby energizing said coil which in turn operates said switch contact means, one of said switch contact means being operative to close said shunt circuit means during the discharge cycle of said capacitor, and the other of said switch contact means being operative to close said output circuit during the discharge cycle of said capacitor.

10. A relaxation divider comprising: a storage capacitor connected at one side to ground; a Zener diode connected at one side to the other side of said capacitor; a switching transistor connected to the other side of said Zener diode; first and second transistors each operably connected to said switching transistor and to a source of biasing voltage; normally open circuit means in shunt around said Zener diode; an output circuit; and means for charging said capacitor by incremental amounts, said capacitor upon being charged to a voltage equal to the rated inverse breakdown voltage of said Zener diode discharging through said Zener diode to turn on said switching transistor and in turn said first and second transistors, one of said transistors operative to close said shunt circuit during the discharge cycle of said capacitor, and the other of said transistors operative to open said output circuit during the discharge cycle of said capacitor.

11. A relaxation divider responsive to a train of input voltage pulses to produce an output voltage pulse comprising:

a controlling circuit portion including a storage capacitance for storing a number of input voltage pulses;

a switching circuit portion;

coupling means connecting said controlling circuit portion to said switching circuit portion to enable a voltage pulse of at least a certain magnitude stored in said capacitance to be passed on to said switching circuit portion;

said switching circuit portion including means producing an output voltage pulse in response to a pulse received from said controlling circuit portion; and bypass means connected across said coupling means, said bypass means being responsive to the output voltage pulses from said switching circuit portion to present substantially an open circuit in the absence of an output voltage pulse and to be rendered substantially conductive in the presence of an output voltage pulse.

References Cited by the Examiner

UNITED STATES PATENTS

| | | |
|---|---|---|
| 2,867,754 | 1/59 | O'Bleness. |
| 2,970,228 | 1/61 | White et al. |
| 2,981,898 | 4/61 | St. John. |
| 3,105,174 | 9/63 | Carson et al. |
| 3,125,686 | 3/64 | Vitt et al. |
| 3,136,926 | 6/64 | Smith -------------- 317—142 X |

FOREIGN PATENTS

| | | |
|---|---|---|
| 815,361 | 6/59 | Great Britain. |

OTHER REFERENCES

Shields: "An Integrating Timer," Radio-Electronics, December 1960, volume XXXI, No. 12, pages 28 and 29.

SAMUEL BERNSTEIN, *Primary Examiner.*

LLOYD McCOLLUM, *Examiner.*